(12) United States Patent
Schmidt

(10) Patent No.: US 9,816,643 B2
(45) Date of Patent: Nov. 14, 2017

(54) DUAL VALVE GAS PRESSURE EQUALIZATION SYSTEM AND METHOD

(71) Applicant: The Boeing Company, Chicago, IL (US)

(72) Inventor: Kevin Schmidt, Norman, OK (US)

(73) Assignee: The Boeing Company, Chicago, IL (US)

( * ) Notice: Subject to any disclaimer, the term of this patent is extended or adjusted under 35 U.S.C. 154(b) by 91 days.

(21) Appl. No.: 14/743,112

(22) Filed: Jun. 18, 2015

(65) Prior Publication Data

US 2016/0368609 A1  Dec. 22, 2016

(51) Int. Cl.

| | |
|---|---|
| *F16K 39/02* | (2006.01) |
| *F16K 39/04* | (2006.01) |
| *F17D 1/20* | (2006.01) |
| *F16K 39/00* | (2006.01) |
| *B64D 13/00* | (2006.01) |

(Continued)

(52) U.S. Cl.
CPC ............ *F16K 39/026* (2013.01); *B64D 13/00* (2013.01); *B64D 13/02* (2013.01); *B64D 15/00* (2013.01); *B64D 37/00* (2013.01); *B64D 47/00* (2013.01); *F15B 11/068* (2013.01); *F15D 1/06* (2013.01); *F16K 39/00* (2013.01); *F16K 39/024* (2013.01); *F16K 39/028* (2013.01); *F16K 39/04* (2013.01); *F16K 39/045* (2013.01); *F17D 1/02* (2013.01); *F17D 1/20* (2013.01); *B64D 2231/00* (2013.01); *Y10T 137/86936* (2015.04); *Y10T 137/87338* (2015.04); *Y10T 137/87539* (2015.04); *Y10T 137/87547* (2015.04)

(58) Field of Classification Search
CPC ........ F16K 39/024; F16K 39/04; F16K 39/06; F16K 39/045; F16K 39/028; F16K 39/00; F16K 39/026; Y10T 137/87338; Y10T 137/87539; Y10T 137/87547; Y10T 137/86936; F17D 1/20
See application file for complete search history.

(56) References Cited

U.S. PATENT DOCUMENTS 1,879,545 A * 9/1932 Seeley ................. G05D 7/0652
 137/486
3,209,779 A * 10/1965 McGowen, Jr. ...... F16K 5/0626
 137/315.17

(Continued)

FOREIGN PATENT DOCUMENTS

| DE | 9105458 | 6/1991 |
|---|---|---|
| GB | 2427015 | 12/2006 |

OTHER PUBLICATIONS

European Search Report, European Application No. 16175020.3, dated Oct. 20, 2016.
Beeson, et al. "Safe Use of Oxygen and Oxygen Systems: Handbook for Design, Operation, and Maintenance; Chapter 5 Design Principles"; 2nd Edition; American Society for Testing and Materials, 2007; ASTM Stock No. MNL36-2nd; pp. 63-64 and 68-69.

(Continued)

*Primary Examiner* — Atif Chaudry
(74) *Attorney, Agent, or Firm* — Perman & Green LLP

(57) ABSTRACT

An aircraft gas transport system including a high pressure gas supply line having a supply valve, and an equilibrium gas line joined at junctions with the high pressure gas supply line upstream and downstream from the supply valve, and in flow communication with the high pressure gas supply line, the equilibrium gas line having an equilibrium valve and a flow restrictor, the equilibrium valve having an exit orifice and the flow restrictor being offset from the exit orifice of the equilibrium valve.

20 Claims, 6 Drawing Sheets

(51) Int. Cl.
    *B64D 15/00*     (2006.01)
    *B64D 37/00*     (2006.01)
    *B64D 47/00*     (2006.01)
    *F15B 11/068*     (2006.01)
    *B64D 13/02*     (2006.01)
    *F15D 1/06*     (2006.01)
    *F17D 1/02*     (2006.01)

(56) References Cited

U.S. PATENT DOCUMENTS

| | | | |
|---|---|---|---|
| 3,389,553 A | 6/1968 | Hardy et al. | |
| 6,591,851 B1 * | 7/2003 | Palten | F04D 19/04 137/12 |
| 6,997,202 B2 * | 2/2006 | Olander | G05D 7/0652 137/12 |
| 8,336,628 B2 | 12/2012 | Myerley | |
| 2009/0314296 A1 * | 12/2009 | Cannon | A62B 7/14 128/205.25 |
| 2011/0108032 A1 * | 5/2011 | Wood | A61G 10/026 128/204.21 |

OTHER PUBLICATIONS

ASTM International, "Designation: G88-13; Standard Guide for Designing Systems for Oxygen Service", ASTM Committee G04 on Compatibility and Sensitivity of Materials in Oxygen Enriched Atmospheres; Nov. 2013.

* cited by examiner

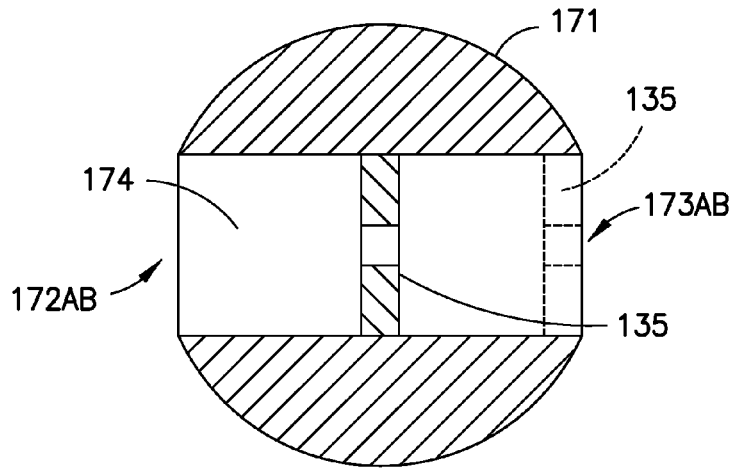
FIG.3A
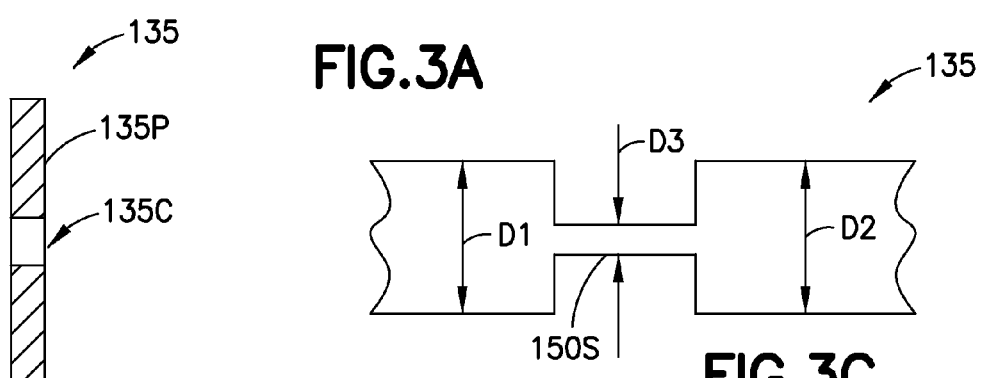
FIG.3B
FIG.3C
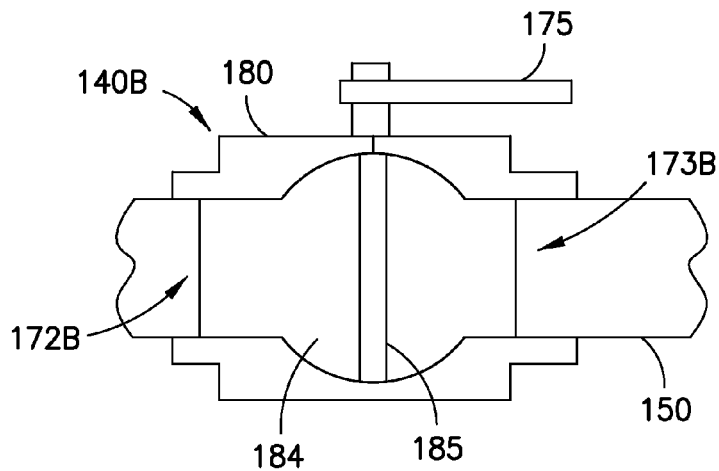
FIG.3D

DUAL VALVE GAS PRESSURE EQUALIZATION SYSTEM AND METHOD

BACKGROUND

Generally, gas supply systems have their gas flow shut off or arrested during maintenance to prevent a flow of gas at a location (e.g. service area) where the maintenance is performed (e.g. such as the servicing or replacement of a regulator in the gas supply line). For example, a flow of gas is shut off by actuating a shut-off valve upstream of the service area. When the gas is allowed to flow again, such as by actuating the valve, the gas supply system is re-pressurized at a rate that depends on the type of shut-off valve being used. However, depending on the type of shut-off valve being used to arrest the fluid flow, particles may be generated within the gas supply line by the shut-off valve when the valve is re-opened where the particles may impinge against an internal wall of the gas supply line. Further, depending on a rate of change in pressurization of the gas within the gas supply line, a high velocity gas flow may increase in temperature due to, for example, adiabatic heating.

To mitigate particle generation and adiabatic heating slow acting valves (such as needle valves with non-rotating needles) are generally used as shut-off valves in gas pressurization systems to allow any heat generated to be dissipated by gradually re-pressurizing the gas supply line. However, the slow acting valves are generally fragile, when compared to fast acting valves, and may leak. In addition, it may be difficult to determine an amount the slow acting valve (such as the needle valve) is opened unless the valve is actively actuated to its limits of travel.

SUMMARY

Accordingly, apparatus and method, intended to address the above-identified concerns, would find utility.

One example of the present disclosure relates to an aircraft gas transport system including a high pressure gas supply line having a supply valve; and an equilibrium gas line joined at a junction with the high pressure gas supply line upstream and downstream from the supply valve, and in flow communication with the high pressure gas supply line, the equilibrium gas line having an equilibrium valve and a flow restrictor, the equilibrium valve having an exit orifice and the flow restrictor being offset from the exit orifice of the equilibrium valve.

One example of the present disclosure relates to an aircraft gas system including a high pressure gas supply control system coupled in flow communication with a high pressure gas supply line, the gas supply control system including a fast acting supply valve; and a pressurization control system dependent from the high pressure gas supply line that is coupled in flow communication with an equilibrium gas line where the equilibrium gas line is joined at a junction with the high pressure gas supply line upstream and downstream from the fast acting supply valve, and in flow communication with the high pressure gas supply line, the pressurization control system includes a fast acting equilibrium valve and a flow restrictor where the fast acting equilibrium valve has an exit orifice and the flow restrictor is offset from the exit orifice of the fast acting equilibrium valve.

One example of the present disclosure relates to a method for pressurizing an aircraft gas transport system after a flow of gas through the aircraft gas transport system has been prevented, the method including opening an equilibrium valve while maintaining a closed position of a supply valve to allow gas to flow through a flow restrictor that controls a rate of change of a pressure downstream from the equilibrium valve; determining that the pressure downstream from the equilibrium valve or the pressure downstream from the supply valve is at a stabilized pressure when the equilibrium valve is open and the supply valve is closed; and opening the supply valve to provide a flow of gas through the supply valve at an operating pressure.

BRIEF DESCRIPTION OF THE DRAWINGS

Figure 1:
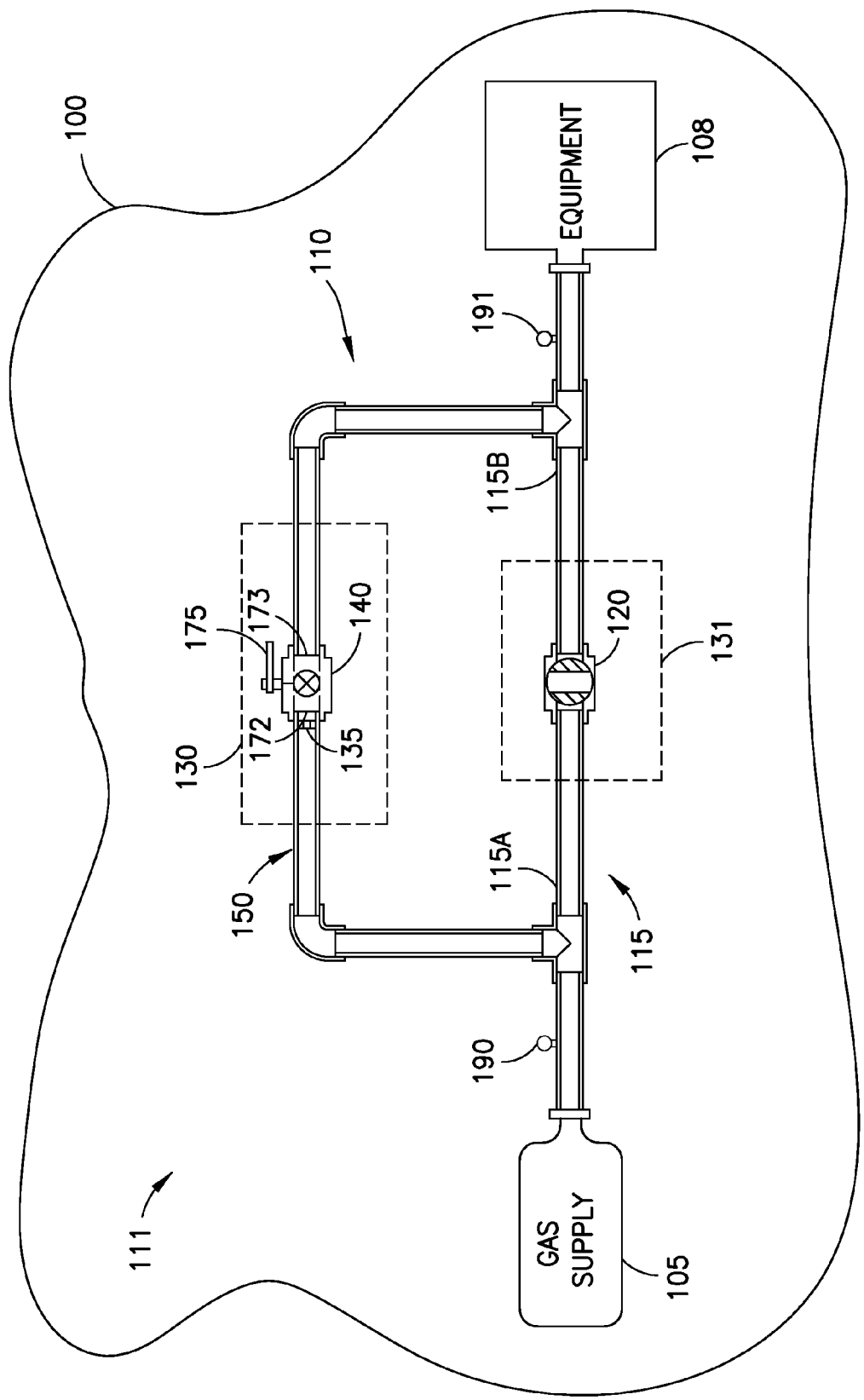
Figure 2A:
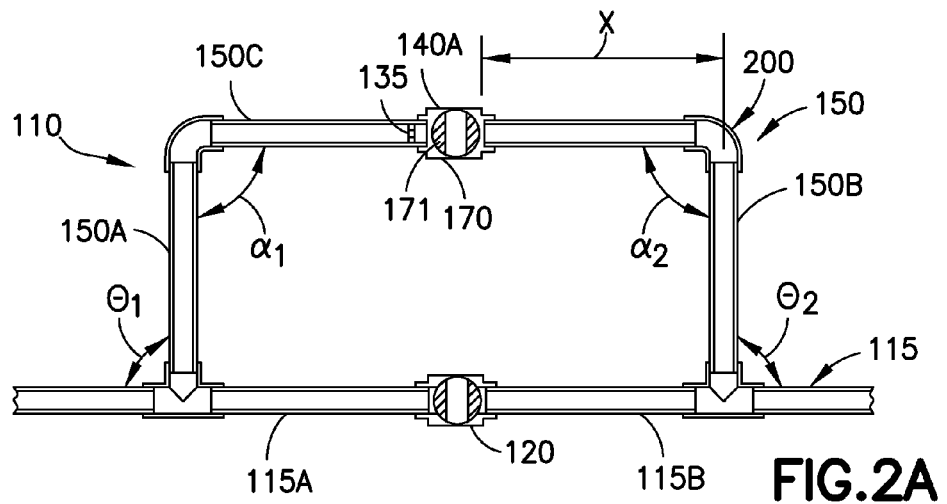
Figure 2B:
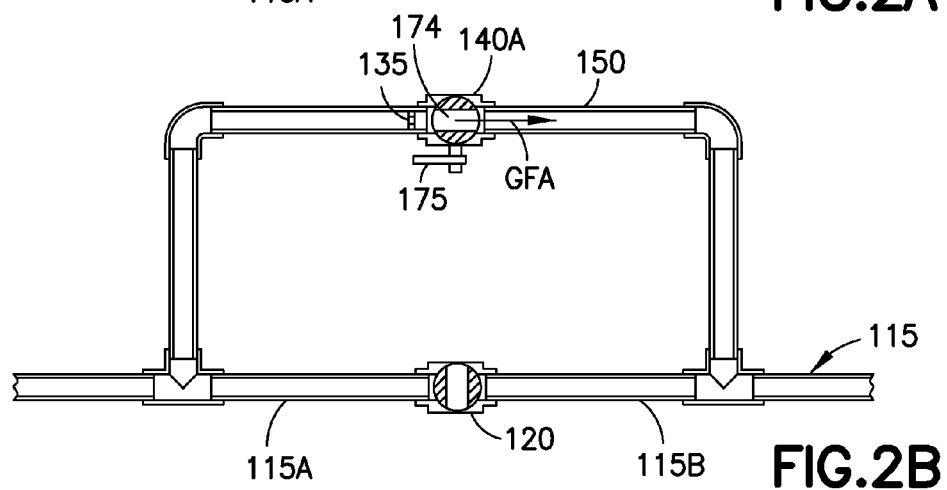
Figure 2C:
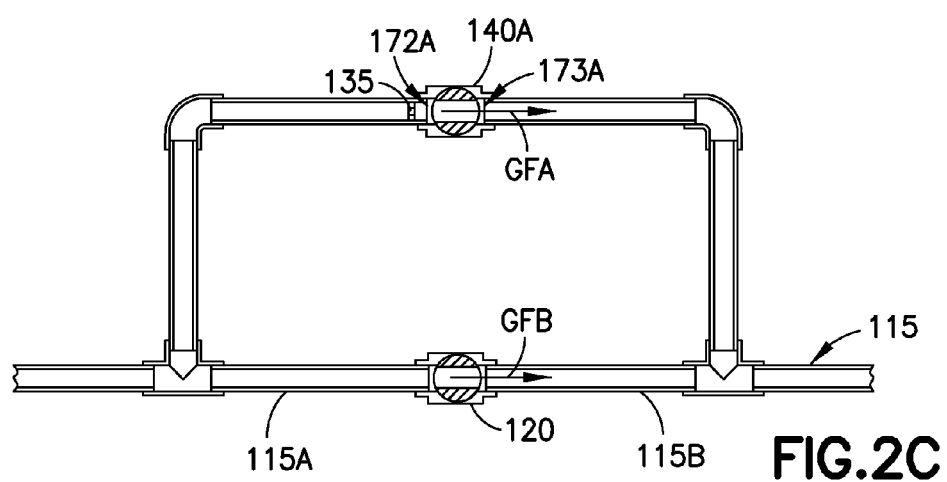
Figure 4:
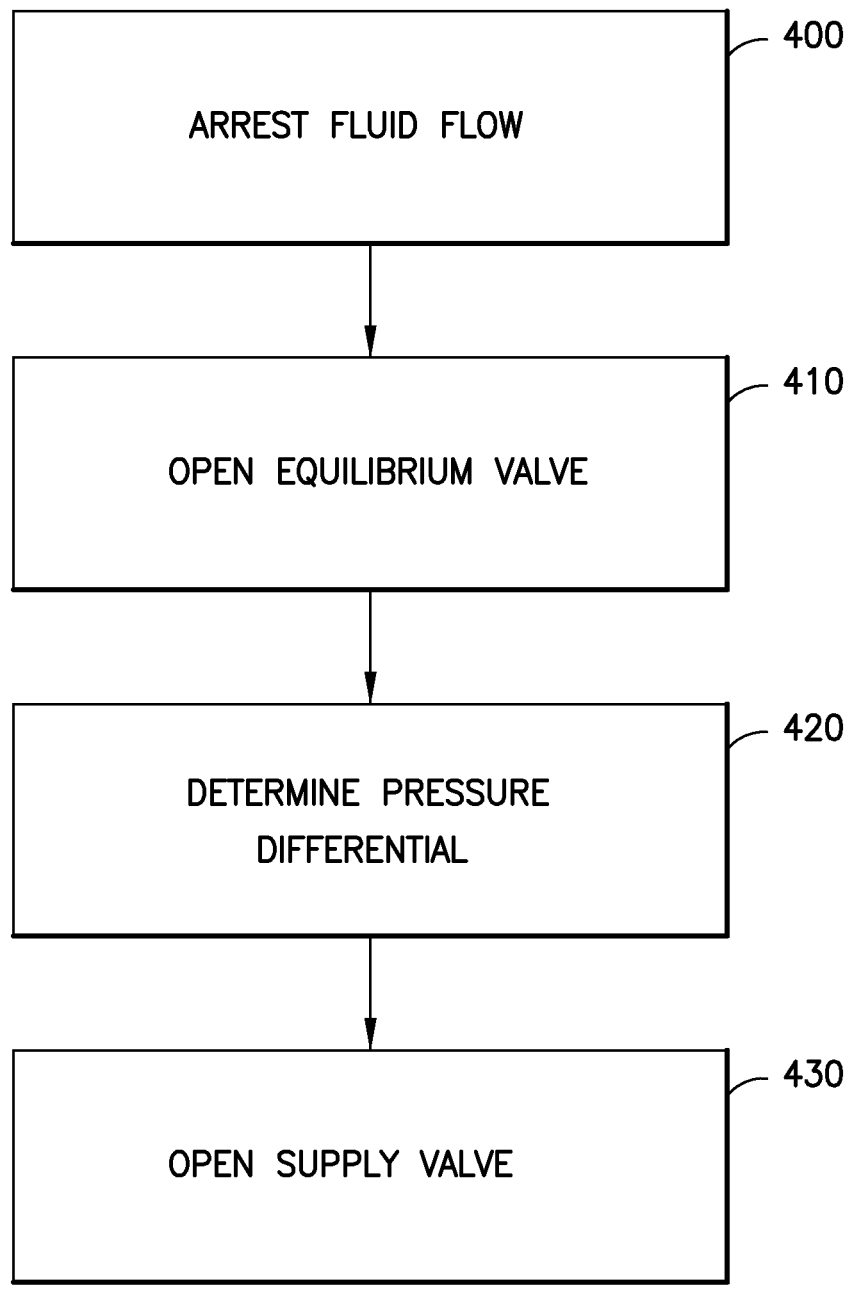
Figure 5:
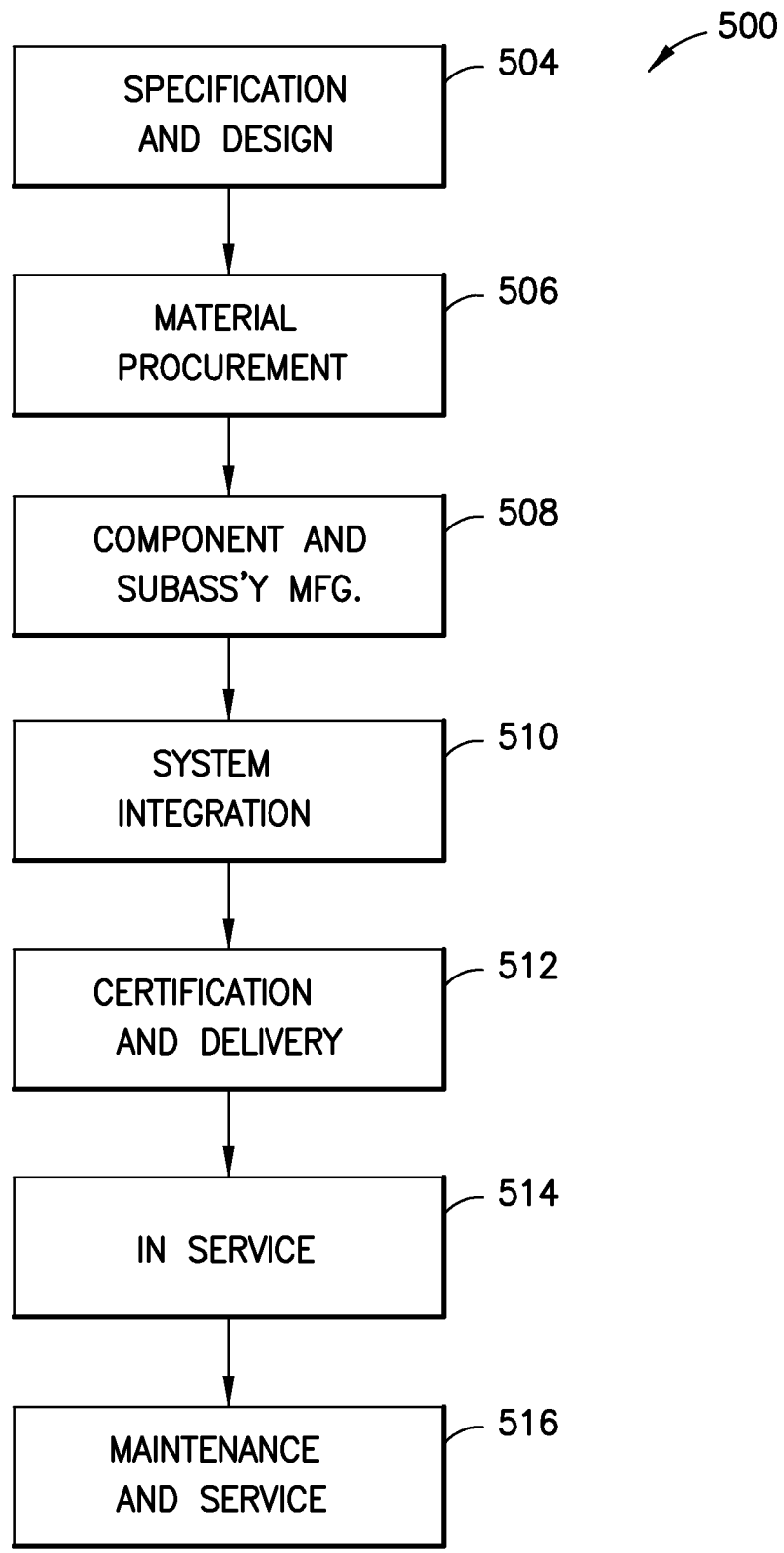

Having thus described examples of the disclosure in general terms, reference will now be made to the accompanying drawings, which are not necessarily drawn to scale, and wherein like reference characters designate the same or similar parts throughout the several views, and wherein:

FIG. 1 is a schematic illustration of a gas pressure equalization system, according to aspects of the present disclosure;

FIGS. 2A, 2B and 2C are schematic illustrations of a gas pressure equalization system, according to aspects of the present disclosure;

FIG. 3A is a portion of a gas pressure equalization system, according to aspects of the present disclosure;

FIG. 3B is a portion of a gas pressure equalization system, according to aspects of the present disclosure;

FIG. 3C is a portion of a gas pressure equalization system, according to aspects of the present disclosure;

FIG. 3D is a portion of a gas pressure equalization system, according to aspects of the present disclosure;

FIG. 4 is a flow diagram of a method, according to aspects of the present disclosure;

FIG. 5 is a flow diagram of aircraft production and service methodology; and

Figure 6:
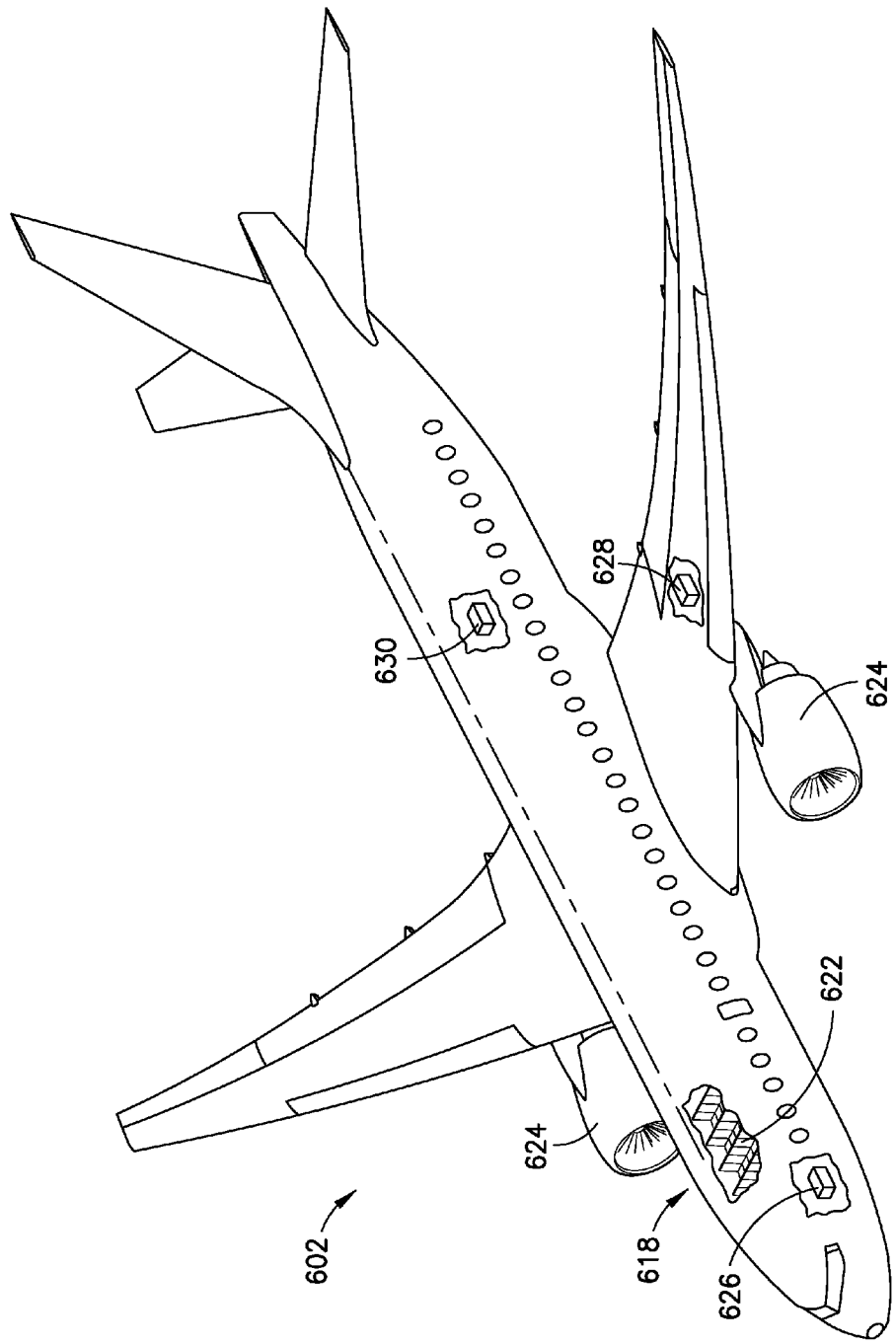

FIG. 6 is a schematic illustration of an aircraft including distributed vehicle systems.

In the block diagram(s) referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Referring to FIG. 1, a gas pressure equalization/transport system 110 (for transporting and pressurizing gas within a gas supply system 111, referred to herein as a "gas pressure equalization system") is illustrated and allows for the transport and pressurization of gas within a fluidic system (e.g. such as gas supply system 111) of an object 100. In one aspect the object 100 is an aerospace vehicle (such as airplane 602 in FIG. 6) while in other aspects the object is a maritime vessel, land based vessel, factory facility or any other object that includes a pressurized fluidic (gas) system. In one aspect the gas supply system 111 is a high pressure gas system having an operating pressure of about 300 pounds per square inch (psi) or about 2068 kilopascals (kPa). In another aspect the gas supply system 111 is a gas system having an operating pressure of about 300 psi (about 2068 kPa) or less. In still another aspects, the gas supply system 111 is a high pressure gas system having an operating pressure of about 300 psi (about 2068 kPa) or more while in yet another aspect the operating pressure is about 1500 psi (about 10340 kPa) to about 2000 psi (about 13790 kPa) or more. According to the aspects of the present disclosure, the gas pressure equalization system 110 provides for the pressure equalization between a portion 115A of a gas supply line 115 upstream of a supply valve 120 and a portion 115B of the gas supply line 115 downstream of the supply valve 120 while reducing or eliminating adiabatic heating and particle impingement on the interior walls of the gas supply line 115.

In one aspect, the gas pressure equalization system 110 includes a gas supply line 115 that is connected at one end to a pressurized gas supply 105 and at another end to one or more pieces of equipment 108 that receive the pressurized gas from the gas supply 105. In one aspect the gas provided by the gas supply 105 is oxygen while in other aspects the gas is any gas useful in, for exemplary purposes only, product manufacturing, vehicle/building environmental systems and/or healthcare systems. As described above, the gas pressure equalization system 110 includes a gas supply control system 131. The gas supply control system 131 includes a supply valve 120, in fluid communication with the gas supply line 115, to arrest (e.g. shut-off) and allow a flow of gas through the gas supply line 115. In one aspect the supply valve 120 is a fast acting valve (where fast acting refers to e.g. a throttling-less, rapid opening valve with substantially no throttling of gas flow as the valve is opened) such as, for example, a ball valve or a butterfly valve which, in one aspect, are substantially similar to equilibrium valve 140 described below. The gas pressure equalization system 110 also includes an equilibrium system 130 (see also FIGS. 2A-2C) to equalize the pressure within the gas supply line 115 portions 115A, 115B after the gas flow in the gas supply system 111 has been arrested or stopped such as by closing the supply valve 120 (and the equilibrium valve 140 described below).

The equilibrium system 130 includes a flow restrictor 135 and a fast acting equilibrium valve 140 that are in fluid communication with each other and with the gas supply line 115. For example, in one aspect an equilibrium gas line 150 is connected at one end to the portion 115A of the gas supply line 115 upstream from the supply valve 120 and is connected at the other end to the portion 115B of the gas supply line 115 downstream of the supply valve 120 so a gas flow through the equilibrium gas line 150 is in a parallel flow arrangement with the gas flow through the gas supply line 115, at least along the portion of the gas supply line 115 where the supply valve is located. The flow restrictor 135 and the equilibrium valve 140 are disposed in series along the equilibrium gas line 150 as will be described in further detail below.

In one aspect, the equilibrium valve 140 is a fast acting valve that includes an inlet orifice 172 and an exit orifice 173 in fluid communication with the equilibrium gas line 150. In one aspect, referring to FIGS. 1 and 2A-C, the equilibrium valve 140 is a fast acting valve such as a ball valve 140A that includes a body 170 and a ball 171 (e.g., a flow arresting member that stops (e.g., inhibits) a flow of gas from flowing through the valve when the valve is in a closed configuration and allows a flow of gas through the valve when the valve is in an open configuration) that is rotatably disposed within the body 170. The ball 171 includes a gas passage 174 having an inlet orifice 172A and an exit orifice 173A through which gas flows when the equilibrium valve 140A is in an open configuration. The ball 171 is coupled to an indicator 175, which in one aspect is a handle of the equilibrium valve 140A, that allows for the rotation of the ball 171 within the body 170 as well as provides an indication of whether the equilibrium valve 140A is in a fully open configuration, a partially open configuration or a closed configuration. In another aspect, referring to FIGS. 1 and 3D, the equilibrium valve 140 is a fast acting valve such as a butterfly valve 140B that includes a body 180. The body 180 includes a gas passage 184 having an inlet orifice 172B and an exit orifice 173B. A disk 185 (e.g., a flow arresting member that stops a flow of gas from flowing through the valve when the valve is in a closed configuration and allows a flow of gas through the valve when the valve is in an open configuration) is rotatably located within the gas passage 184 between the inlet orifice 172B and exit orifice 173B for arresting or allowing gas to flow through the gas passage 184. The disk 185 is coupled to an indicator 175, which in one aspect is a handle of the equilibrium valve 140B, that allows for the rotation of the disk 185 within the body 180 as well as provides an indication of whether the equilibrium valve 140B is in a fully open configuration, a partially open configuration or a closed configuration. In other aspects, the fast acting valve 140 is a plug valve or any other fast or quick acting valve. It is noted that the fast acting valves 140 described herein are, in one aspect, manually operated valves while in other aspects the fast acting valves 140 are automatic valves operated by, for examples, solenoids.

Referring to FIGS. 1 and 3B, in one aspect, the flow restrictor 135 is disposed in flow communication with the equilibrium valve 140 where the flow restrictor 135 is offset from the exit orifice 173. For example, in one aspect, the flow restrictor 135 is located upstream of the exit orifice 173 of the equilibrium valve 140 while in other aspects, the flow restrictor 135 is located downstream of the exit orifice 173 and controls a rate of change in pressure downstream from the equilibrium valve 140 when the equilibrium valve 140 is in an open configuration. In one aspect, the flow restrictor 135 is an orifice plate 135P having a central orifice 135C that restrains flow to the equilibrium valve 140 when the equilibrium valve 140 is in an open configuration. In other aspects, referring also to FIG. 3C, the flow restrictor 135 includes varying pipe diameters. For example, the equilibrium gas line 150 includes a stepped portion 150S where a diameter of the equilibrium gas line 150 reduces from a first diameter D1 to a second diameter D2 and then increases to a third diameter D3, where the second diameter D2 is smaller than the first diameter D1 and the third diameter D3. In one aspect the first diameter D1 and the third diameter D3 are the same while in other aspects the first diameter D1 and the third diameter D3 are different from each other. The reduced pipe diameter D3 restrains flow to the equilibrium valve 140 when the equilibrium valve 140 is in an open configuration for controlling a rate of change in pressure downstream from the equilibrium valve 140 when the equilibrium valve 140 is in the open configuration.

In one aspect, referring to FIG. 1, the flow restrictor 135 is located within the equilibrium gas line 150 upstream of the exit orifice 173 and upstream of the equilibrium valve 140 itself. In this aspect, the flow restrictor is placed as close as possible to the inlet orifice 172 of the equilibrium valve 140 so the flow restrictor 135 does not interfere with an operation of the equilibrium valve 140 (e.g. the flow restrictor is placed as close as possible to the inlet orifice 172 while still allowing free/normal operation of the equilibrium valve 140). In another aspect, referring to FIG. 3A, the flow restrictor 135 is integral to the equilibrium valve 140 such as equilibrium valve 140A. For example, in this aspect the flow restrictor 135 is located within the gas passage 174 of the ball 171 so that the flow restrictor 135 is integral with the ball 171. In one aspect the flow restrictor 135 is located between the inlet orifice 172AB and exit orifice 173AB of the ball 171 while in other aspects the flow restrictor 135 may be located at one of the inlet orifice 172AB and exit orifice 173AB (e.g., at one end of the gas passage 174 of the ball 171 as illustrated by the dashed lines in FIG. 3). In still other aspects, the flow restrictor 135 is in the form of a staged butterfly valve that meters the flow of gas through the equilibrium gas line 150.

Referring to FIGS. 1 and 2A-2C an exemplary configuration of the gas pressure equalization system 110 is illustrated. In this aspect the equilibrium gas line 150 includes a first and second branching portion 150A, 150B and a restrictor portion 150C. The first branching portion 150A connects to the gas supply line 115 at a junction or joint having an angle θ1 which in one aspect is about a 90° angle while in other aspect the angle θ1 is greater or less than 90°. The second branching portion 150B connects to the gas supply line at a junction or joint having an angle θ2 which in one aspect is about a 90° angle while in other aspect the angle θ2 is greater or less than 90°. The restrictor portion 150C, which includes the flow restrictor 135 and the equilibrium valve 140 (equilibrium valve 140A is illustrated in FIGS. 2A-2C for exemplary purposes), connects to the first and second branching portions 150A, 150B at respective connections having angles α1, α2. In one aspect the angles α1, α2 are about 90° angles while in other aspects the angles α1, α2 are more or less than about 90°. In one aspect the angles α1, α2 are about the same while in other aspects the angles α1, α2 are different from each other. The angles θ1, θ2, α1, α2 are, in one aspect, configured to provide a smooth laminar a flow of gas (e.g., reduce turbulence) through the equilibrium gas line 150 to reduce particle impingement.

It should be understood that while straight pipe sections are illustrated in FIGS. 2A-2C in other aspects the pipe sections may be curved or have any other configuration for forming the equilibrium gas line 150, the gas supply line 115 and the connections therebetween. It should also be understood that flow restrictor 135 and equilibrium valve 140 can be located in any one of the first and second branch portions 150A, 150B and the restrictor portion 150C. Where there is a bend, such as bend 200, in the equilibrium gas line 150 downstream of the equilibrium valve 140, the equilibrium valve 140 is located a predetermined distance X upstream of the bend 200 to provide a substantially straight length of pipe after the equilibrium valve 140. In one aspect the distance X is about eight (8) pipe diameters while in other aspects the distance X is more or less than about eight (8) pipe diameters. In one aspect, the distance X may depend on an operating pressure of the gas supply system 111 (see FIG. 1).

Referring to FIGS. 1, 2A-2C and 4 an exemplary operation of the gas pressure equalization system 110 will be described. In one aspect the equilibrium valve 140 (again equilibrium valve 140A is illustrated in FIGS. 2A-2C for exemplary purposes) and the supply valve 120 are closed (e.g., in a closed configuration) as shown in FIG. 2A to arrest a flow of gas through the equilibrium gas line 150 and the gas supply line 115 (e.g., to arrest a flow of gas in the gas supply system 111 downstream of the supply valve 120) (FIG. 4, Block 400). In one aspect the flow of gas is arrested to perform maintenance of the gas supply system 111 downstream of the supply valve 120. With the equilibrium valve 140 and the supply valve 120 in the closed configuration, the portion of the gas supply system 111 downstream of the supply valve 120 (and the equilibrium valve 140) is at atmospheric pressure (or another pressure that is less than the operating pressure of the gas supply system 111) such as after the gas supply system 111 has been opened for maintenance and then reassembled. The portion 115B of the gas supply line 115 downstream from the supply valve 120 is re-pressurized/pressurized prior to opening the supply valve 120. In one aspect the equilibrium valve 140 is opened, as shown in FIG. 2B, to allow a flow of gas GFA through the equilibrium gas line 150 and into the portion 115B of the gas supply line 115 for re-pressurizing/pressuring the portion 115B while maintaining the supply valve 120 in the closed configuration (FIG. 4, Block 410). As described above, the flow restrictor 135 controls a rate of change of pressure downstream from the equilibrium valve 140 during re-pressurization/pressurization of the portion 115B of the gas supply line 115. A pressure differential is determined between the portions 115A, 115B of the gas supply line 115 to verify that the pressure within the gas supply system 111, between the portions 115A, 115B of the gas supply line 115, is stabilized, e.g., at a steady state (FIG. 4, Block 420). In one aspect, the pressure of the gas supply system 111 is stabilized when the pressure downstream of the equilibrium valve 140A, 140B and/or downstream of the supply valve 120 (e.g., a pressure in the portion 115B of the gas supply line 115) is determined to be within a predetermined pressure range that corresponds with the pressure upstream of the equilibrium valve 140 and/or upstream of the supply valve 120 (e.g., a pressure in the portion 115A of the gas supply line 115). In one aspect the predetermined pressure range is about a 5% pressure differential between the upstream portion 115A and downstream portion 115B of the gas supply line 115. In other aspects the predetermined pressure range is more or less than about a 5% pressure differential. In one aspect, the upstream and downstream pressures are determined with, for example, one or more pressure sensors 190, 191 disposed in respective portions 115A, 115B of the gas supply line 115. In another aspect, a predetermined time period is provided for stabilizing the system pressure so that the system pressure is at a steady state. In one aspect the predetermined time period is on the order of a few seconds while in other aspects the predetermined time period is less than one minute. In one aspect, the pressure differential for a stabilized system and/or the time it takes for the system pressure to stabilize depends on the operating pressure and size of the gas supply system 111. For example, the pressure differential between the upstream portion 115A and the downstream portion 115B may be greater for low pressure systems than high pressure systems. Also, a system with more downstream volume would take longer to reach the steady state pressure than a system with less downstream volume however, the system with a larger downstream volume would allow for a greater pressure differential when determining whether the steady state pressure has been reached in the gas supply system 111. When the gas supply system is stabilized (e.g., reaches a steady state pressure), the supply valve 120 is opened, as shown in FIG. 2C, to provide a flow of gas GFB through the supply valve 120 at the predetermined operating pressure of the gas supply system 111 (FIG. 4, Block 430). In one aspect, the predetermined operating pressure is greater than the stabilized or steady state pressure so that opening the supply valve 120 increases the system pressure to the predetermined operating pressure. In another aspect, the predetermined operating pressure and the stabilized or steady state pressure are the same. In one aspect, during operation of the gas supply system 111 both of the equilibrium valve 140 and the supply valve 120 are in an open configuration while in other aspects the equilibrium valve 140 may be closed during operation of the gas supply system 111.

The disclosure and drawing figures describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Examples of the disclosure may be described in the context of an aircraft manufacturing and service method 500 as shown in FIG. 5 and an aircraft 602 as shown in FIG. 6. During pre-production, illustrative method 500 may include specification and design 504 of the aircraft 602 and material procurement 506. During production, component and sub-assembly manufacturing 508 (which in one aspect include the gas supply system 111) and system integration 510 of the aircraft 602 take place. Thereafter, the aircraft 602 may go through certification and delivery 512 to be placed in service 514. While in service by a customer, the aircraft 602 is scheduled for routine maintenance and service 516 (which may also include modification, reconfiguration, refurbishment, and so on) that in one aspect includes pressurizing a gas supply system 111 of the aircraft 602 with the equilibrium system 130 described herein.

Each of the processes of the illustrative method 500 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 6, the aircraft 602 produced by the illustrative method 500 may include an airframe 618 with a plurality of high-level systems and an interior 622. Examples of high-level systems, which are distributed throughout the aircraft, include one or more of a propulsion system 624, an electrical power system 626, a hydraulic system 628, and an environmental system 630 which in one aspect includes the gas supply system 111 described herein. Any number of other systems may be included. Although an aerospace example is shown, the principles of the invention may be applied to other industries, such as the automotive and maritime industries.

Apparatus and methods shown or described herein may be employed during any one or more of the stages of the manufacturing and service method 500. For example, components or subassemblies corresponding to component and subassembly manufacturing 508 may be fabricated or manufactured in a manner similar to components or subassemblies produced while the aircraft 602 is in service. Also, one or more aspects of the apparatus, method, or combination thereof may be utilized during the production states 508 and 510, for example, by substantially expediting assembly of or reducing the cost of an aircraft 602. Similarly, one or more aspects of the apparatus or method realizations, or a combination thereof, may be utilized, for example and without limitation, while the aircraft 602 is in service, e.g., operation, maintenance and service 516 such as when the environmental system 630 is being serviced.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

In one or more aspects of the present disclosure an aircraft gas transport system includes a high pressure gas supply line having a supply valve; and an equilibrium gas line joined at junctions with the high pressure gas supply line upstream and downstream from the supply valve, and in flow communication with the high pressure gas supply line, the equilibrium gas line having an equilibrium valve and a flow restrictor, the equilibrium valve having an exit orifice and the flow restrictor being offset from the exit orifice of the equilibrium valve.

In one or more aspects of the present disclosure the flow restrictor controls a rate of change in pressure downstream from the equilibrium valve when the equilibrium valve is open.

In one or more aspects of the present disclosure the supply valve and the equilibrium valve are fast acting valves.

In one or more aspects of the present disclosure the supply valve is a ball valve.

In one or more aspects of the present disclosure the supply valve is a butterfly valve.

In one or more aspects of the present disclosure the equilibrium valve is a ball valve.

In one or more aspects of the present disclosure the equilibrium valve is a butterfly valve.

In one or more aspects of the present disclosure the equilibrium gas line is arranged relative to the high pressure gas supply line so the equilibrium valve is in parallel gas flow with the supply valve.

In one or more aspects of the present disclosure the flow restrictor is an orifice plate having a central orifice that restrains flow to the equilibrium valve when the equilibrium valve is open.

In one or more aspects of the present disclosure the equilibrium valve includes a flow arresting member which inhibits a flow of gas when the equilibrium valve is closed and allows a flow of gas when the equilibrium valve is open, the flow restrictor being integral with the flow arresting member.

In one or more aspects of the present disclosure the equilibrium valve is a ball valve and the flow arresting member is a ball of the ball valve, the flow restrictor being disposed within a gas passage of the ball.

In one or more aspects of the present disclosure the flow restrictor is upstream from the exit orifice of the equilibrium valve.

In one or more aspects of the present disclosure the flow restrictor is upstream from the equilibrium valve.

In one or more aspects of the present disclosure the equilibrium valve is located a predetermined distance upstream from a bend in the equilibrium gas line.

In one or more aspects of the present disclosure the predetermined distance is at least eight times a diameter of the equilibrium gas line.

In one or more aspects of the present disclosure an aircraft gas system includes a high pressure gas supply control system coupled in flow communication with a high pressure gas supply line, the gas supply control system including a fast acting supply valve; and a pressurization control system dependent from the high pressure gas supply line that is coupled in flow communication with an equilibrium gas line, where the equilibrium gas line is joined at junctions with the high pressure gas supply line upstream and downstream from the fast acting supply valve, and in flow communication with the high pressure gas supply line, the pressurization control system includes a fast acting equilibrium valve and a flow restrictor, where the fast acting equilibrium valve has an exit orifice and the flow restrictor is offset from the exit orifice of the fast acting equilibrium valve.

In one or more aspects of the present disclosure the flow restrictor controls a rate of change in pressure downstream from the fast acting equilibrium valve when the equilibrium valve is open.

In one or more aspects of the present disclosure the fast acting supply valve is a ball valve or a butterfly valve.

In one or more aspects of the present disclosure the fast acting equilibrium valve is a ball valve or a butterfly valve.

In one or more aspects of the present disclosure the pressurization control system is arranged relative to the high pressure gas supply control system so the pressurization control system and the high pressure gas supply control system have parallel gas flows.

In one or more aspects of the present disclosure the flow restrictor is an orifice plate having a central orifice that restrains flow to the fast acting equilibrium valve when the fast acting equilibrium valve is open.

In one or more aspects of the present disclosure the fast acting equilibrium valve includes a flow arresting member which stops a flow of gas when the fast acting equilibrium valve is closed and allows a flow of gas when the fast acting equilibrium valve is open, the flow restrictor being integral with the flow arresting member.

In one or more aspects of the present disclosure the fast acting equilibrium valve is a ball valve and the flow arresting member is a ball of the ball valve, the flow restrictor being disposed within a gas passage of the ball.

In one or more aspects of the present disclosure the fast opening equilibrium valve is located a predetermined distance upstream from a bend in the equilibrium gas line.

In one or more aspects of the present disclosure the high pressure gas supply control system is configured to supply oxygen gas.

In one or more aspects of the present disclosure a method for pressurizing a gas transport system after a flow of gas through the gas transport system has been prevented, the method includes opening an equilibrium valve while maintaining a closed position of a supply valve to allow gas to flow through a flow restrictor that controls a rate of change of a pressure downstream from the equilibrium valve; determining that the pressure downstream from the equilibrium valve or the pressure downstream from the supply valve is at a stabilized pressure when the equilibrium valve is open and the supply valve is closed; and opening the supply valve to provide a flow of gas through the supply valve at an operating pressure.

In one or more aspects of the present disclosure opening the equilibrium valve includes opening a fast acting valve.

In one or more aspects of the present disclosure opening the equilibrium valve allows gas to bypass the supply valve in a gas flow that is in parallel to the flow of gas through the supply valve.

In one or more aspects of the present disclosure the method further comprising indicating an open or closed position of each of the equilibrium valve and the supply valve.

In one or more aspects of the present disclosure the method further comprises pressurizing the gas system to an operating pressure that is greater than the stabilized pressure.

In one or more aspects of the present disclosure when stabilized the pressure downstream from the equilibrium valve or the pressure downstream from the supply valve is within a predetermined range of pressures.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:
1. An aircraft gas transport system comprising:
a high pressure gas supply line having a supply valve and being configured to couple an aircraft gas supply to one or more pieces of equipment onboard an aircraft that receive high pressure gas from the aircraft gas supply; and an equilibrium gas line joined at junctions with the high pressure gas supply line upstream and downstream from the supply valve, and in flow communication with the high pressure gas supply line, the equilibrium gas line having an equilibrium valve and a flow restrictor, the equilibrium valve having an exit orifice and wherein the equilibrium valve is disposed within the equilibrium gas line at a predetermined location, and the flow restrictor is configured to mitigate adiabatic heating and particle impingement on interior walls of the high pressure gas supply line caused by an inrush of high pressure gas from the aircraft gas supply into the high pressure gas supply line, wherein the flow restrictor is spatially offset from the exit orifice of the equilibrium valve.

2. The aircraft gas transport system of claim 1, wherein the flow restrictor controls a rate of change in pressure downstream from the equilibrium valve when the equilibrium valve is open.

3. The aircraft gas transport system of claim 1, wherein the supply valve and the equilibrium valve are fast acting valves.

4. The aircraft gas transport system of claim 1, wherein the supply valve is one of a ball valve and a butterfly valve.

5. The aircraft gas transport system of claim 1, wherein the equilibrium valve is one of a ball valve and a butterfly valve.

6. The aircraft gas transport system of claim 1, wherein the equilibrium gas line is arranged relative to the high pressure gas supply line so the equilibrium valve is in parallel gas flow with the supply valve and the high pressure gas is maintained at substantially constant predetermined operating pressure from the aircraft gas supply to the one or more pieces of equipment onboard the aircraft.

7. The aircraft gas transport system of claim 1, wherein the flow restrictor is an orifice plate having a central orifice that restrains flow to the equilibrium valve when the equilibrium valve is open.

8. The aircraft gas transport system of claim 1, wherein the equilibrium valve includes a flow arresting member which inhibits a flow of gas when the equilibrium valve is closed and allows a flow of gas when the equilibrium valve is open, the flow restrictor being integral with the flow arresting member.

9. The aircraft gas transport system of claim 8, wherein the equilibrium valve is a ball valve and the flow arresting member is a ball of the ball valve, the flow restrictor being disposed within a gas passage of the ball.

10. The aircraft gas transport system of claim 1, wherein the flow restrictor is upstream from the exit orifice of the equilibrium valve.

11. The aircraft gas transport system of claim 1, wherein the flow restrictor is upstream from the equilibrium valve.

12. The aircraft gas transport system of claim 1, wherein the equilibrium valve is located a predetermined distance upstream from a bend in the equilibrium gas line.

13. The aircraft gas transport system of claim 12, wherein the predetermined distance is at least eight times a diameter of the equilibrium gas line.

14. An aircraft gas system comprising:

a high pressure gas supply control system coupled in flow communication with a high pressure gas supply line coupling an aircraft gas supply to one or more pieces of equipment onboard an aircraft that receive high pressure gas from the aircraft gas supply, the gas supply control system including a fast acting supply valve; and a pressurization control system dependent from the high pressure gas supply line that is coupled in flow communication with an equilibrium gas line, wherein the equilibrium gas line is joined at junctions with the high pressure gas supply line upstream and downstream from the fast acting supply valve, and in flow communication with the high pressure gas supply line, the pressurization control system includes a fast acting equilibrium valve and a flow restrictor, wherein the fast acting equilibrium valve has an exit orifice and wherein the fast acting equilibrium valve is disposed within the equilibrium gas line, and the flow restrictor is configured to mitigate adiabatic heating and particle impingement on interior walls of the high pressure gas supply line caused by an inrush of high pressure gas from the aircraft gas supply into the high pressure gas supply line, wherein the flow restrictor is spatially offset from the exit orifice of the fast acting equilibrium valve.

15. The aircraft gas system of claim 14, wherein the pressurization control system is arranged relative to the high pressure gas supply control system so the pressurization control system and the high pressure gas supply control system have parallel gas flows.

16. The aircraft gas system of claim 14, wherein the high pressure gas supply control system is configured to supply oxygen gas.

17. A method for pressurizing a gas transport system after a flow of gas through the gas transport system has been prevented, the method comprising:

opening an equilibrium valve in a bypass line while maintaining a closed position of a supply valve in a high pressure supply line to allow gas to flow through a flow restrictor that controls a rate of change of a pressure downstream from the equilibrium valve so that gas flows from an aircraft gas supply through the high pressure supply line bypassing the supply valve to one or more pieces of equipment onboard an aircraft that receive high pressure gas from the high pressure supply line, the flow restrictor and equilibrium valve being disposed at predetermined locations within the bypass line and relative to each other so that the flow restrictor is configured to mitigate adiabatic heating and particle impingement on interior walls of the high pressure supply line caused by an inrush of high pressure gas from the aircraft gas supply into the high pressure supply line upon the pressurization of the gas transport system;

determining that the pressure downstream from the equilibrium valve or the pressure downstream from the supply valve is at a stabilized pressure when the equilibrium valve is open and the supply valve is closed; and opening the supply valve to provide a high pressure flow of gas through the supply valve at an operating pressure.

18. The method of claim 17, wherein opening the equilibrium valve includes opening a fast acting valve.

19. The method of claim 17, wherein opening the equilibrium valve allows gas to bypass the supply valve in a gas flow that is in parallel to the flow of gas through the supply valve.

20. The method of claim 17, wherein when stabilized the pressure downstream from the equilibrium valve or the pressure downstream from the supply valve is within a predetermined range of pressures.

* * * * *